United States Patent [19]

Fukuda

[11] Patent Number: 4,592,284

[45] Date of Patent: Jun. 3, 1986

[54] AUTOMATIC TRANSPORTATION APPARATUS MAKING USE OF UNDERGROUND CABLE

[76] Inventor: Tomiichi Fukuda, 3-23-18 Denenchofu, Ohta-Ku, Tokyo, Japan

[21] Appl. No.: 512,764

[22] Filed: Jul. 11, 1983

[51] Int. Cl.$^4$ .............................................. B61B 11/00
[52] U.S. Cl. ................... 104/140; 104/191; 104/194; 135/34; 280/DIG. 6; D12/16; D34/15
[58] Field of Search ................ 104/53, 118, 139, 140, 104/173 R, 189, 191, 194; 105/141, 142; 280/DIG. 5, DIG. 6; 135/34, 33 R, 33 C; 224/274; 150/526; D12/16; D34/15

[56] References Cited

U.S. PATENT DOCUMENTS

| | | | |
|---|---|---|---|
| 235,127 | 12/1880 | Chubb | 104/189 |
| 462,135 | 10/1891 | Hughes | 104/194 |
| 587,353 | 8/1897 | Wilson | 104/140 |
| 821,863 | 5/1906 | Derr | 105/141 |
| 1,152,290 | 8/1915 | Carruthers | 104/173 R X |
| 2,143,978 | 1/1939 | Eeles | 135/34 X |
| 2,238,569 | 4/1941 | Saxton | 105/141 |
| 2,772,113 | 11/1956 | Berard | 280/DIG. 5 |
| 3,838,648 | 10/1974 | Dahlberg et al. | 104/140 X |
| 4,092,929 | 6/1978 | Laurent | 104/173 R |
| 4,440,091 | 4/1984 | Burgess | 104/139 |

FOREIGN PATENT DOCUMENTS

271224 2/1930 Italy ................................. 104/173 R
250495 4/1926 United Kingdom ............ 104/173 R

Primary Examiner—Randolph A. Reese
Attorney, Agent, or Firm—Wenderoth, Lind & Ponack

[57] ABSTRACT

An automatic transportation system and the vehicles thereof for use, for example, in transporting golf clubs and related equipment around a golf course. The system includes U-shaped channel members embedded end-to-end in the ground provided with pulleys therein for guiding a closed cable therealong in a predetermined path, and a cart having a truck, a grip extending from the truck clampable to the cable so that the cart is pulled by the cable when the cable is moved along the path, a main wheel rotatably mounted to the truck centrally thereof for supporting the cart on the channel members, and a guide device mounted to the truck and extendable into the channel members for engaging the interior surface of the channel members to prevent the cart from falling over and preventing contact between the grip and the pulleys. In the preferred embodiment of the invention, the U-shaped channel members are covered by narrow artificial lawn strips so as not to detract from the appearance of the golf course, and an umbrella-like cover is provided on the golf cart so as to cover the contents of the cart, zippers or the like being provided radially in the covers so as to permit a portion of the cart to be uncovered while the remainder of the cart remains covered.

14 Claims, 13 Drawing Figures

AUTOMATIC TRANSPORTATION APPARATUS MAKING USE OF UNDERGROUND CABLE

BACKGROUND OF THE INVENTION

The present invention relates to a transportation apparatus for carrying goods such as golf bags and transporting the same automatically along a predetermined course such as a path on a golf course.

Hitherto, various apparatuses have been used in transporting golf clubs, a number of golf bags, and other goods along golf courses, such as hand carts for golf bags, electrically driven vehicles, mono-rail type vehicles, lift-type vehicles and devices known commercially by the name "Green Boy".

There are serious disadvantages to each of these apparatuses. Hand carts for carrying multiple golf bags require excessive attention and energy from a caddy. Electrically driven golf carts, for example, can cause serious damage to the fairway of the golf course so that it has been necessary to lay paved paths or rails along the golf course to provide a passage for such vehicles. The other known transportation apparatuses as noted above require rails and posts of considerable height from the ground.

The laying of paved lanes, rails, posts and so forth not only degrade the landscape of the golf course, but also can interfere with play since golf balls impinging on the paved paths or rails usually rebound irregularly, thereby interfering with the pleasure of the game. The provision of golf carts and paths also prolong the playing time, since the paths usually are spaced substantially from the fairway or rough onto which the golf balls fall. In some cases, the golfer is obliged to drive his electric golf cart or the like across the lawn (fairway or rough). Electric golf carts typically have a weight in excess of 85 Kg and frictionally engage the lawn with great force during acceleration and deceleration, and can cause serious damage to the lawn costing considerable sums of money to repair.

One known transportation system in which vehicles follow a predetermined path and can be disconnected from the path as needed is the streetcar. The streetcars of San Francisco, for example, each have a grip for clamping and unclamping a cable which runs underground, to cause the streetcars to run and stop as desired.

Such a cable system would, however, have serious problems as applied to transporting golf bags on a golf course. It is necessary to lay and stretch the cable, e.g. rope, to closely follow the landscape, including planar ground (horizontal or inclined), protruding mountainous ground, and concave ground at the transient areas between the planar ground and the protruding ground. The cable can be contained in the planar or protruding ground without substantial difficulty by supporting the cable from the lower side thereof. It is also possible to lay and stretch the cable along a curved path by employing a multiplicity of pulleys contacting the surfaces of the cable along the curved segments thereof. However, where the ground is concave, the cable may jump up above the ground surface unless the cable is held down by a pulley contacting the upper surface of the cable. In a streetcar of the type mentioned above, a grip mounted to the streetcar clamps the cable from the upper side thereof. This movement of the grip on the cable is hindered by pulleys which press downward on the upper side of the cable. Therefore, in the segments of the cable where the pulleys are employed for preventing the cable from jumping up, i.e. along the concave ground segments, the grip is temporarily disengaged from the cable and then caused to reengage the cable after the vehicle has cleared such segment by inertia or otherwise, e.g. by manual force.

As a result of these characteristics of prior cable systems, several difficulties present themselves. For example, the vehicles are required to repeatedly stop, pull up on the grip and clamp the cable when applied to a complicated landscape such as one having a number of crests and valleys. This prior system therefore can be used only on a simple landscape or on an artificial surface.

Also, the conventional golf cart, for example, hand cart, motor-operated cart, mono-rail cart or Green Boy cart, has been employed for carrying four golf bags mounted in parallel and a covering sheet has been used to protect the golf bags in the event of rain. When the golf clubs are inserted and removed from the bags, the entire sheet must be removed from covering the bags. Although the cover can be set at a high position in order to permit the golfers to easily place their clubs in and move their clubs from their golf bags, such a cover could cause the stability of the cart to be affected by the wind since a high center of gravity would increase the tendency of the cart to become unstable and blow over. Furthermore, if the cover is mounted higher, there is a greater likelihood that the rain will blow under the cover onto the golf clubs. Another disadvantage of the above-described multi-golf bag golf cart is that as a result of the parallel arrangement of the bags, the golfers must take turns approaching their bags to obtain or exchange golf clubs. Finally, it is noted that if each golfer carries his own umbrella, he would generally be required to turn his umbrella over to the care of another each time he approaches his ball for a golf shot.

OBJECTS OF THE INVENTION

It is therefore an object of the invention to provide an apparatus for transporting carts along an endless path drawn by a cable, in which the disadvantages of the prior cable arrangements are overcome. In particular, it is an object of the invention to provide a means for transporting objects such as golf bags around a golf course automatically without detracting from the natural beauty of the golf course or interfering with the natural interaction of the golf ball with its environment.

It is also an object of the present invention to provide a transportation apparatus for carrying objects such as golf bags along a closed path drawn by an underground cable, wherein the cable is maintained completely beneath the surface of the ground even in very irregular terrain.

It is another object of the invention to provide such a transportation apparatus in which the cable is guided by pulleys rotatable in the plane of the ground and in which carts removably grip the cable to be pulled along the closed path, the grip being maintained out of contact with the pulleys as it passes, thereby eliminating the noise, instability and wear which would result from such contact.

It is another object of the invention to provide a cable drawn cart which is easily removed from the path along which the endless cable is provided so that it may be manually moved to other positions as desired.

It is also an object of the invention to provide a transportation system including a lightweight golf cart for carrying multiple golf bags drawn by an endless cable embedded in a channel beneath the ground, strictly limiting direct contact between the cart and the natural lawn of the golf course and substantially limiting the automatic movement of the golf cart to a narrow path coverable by an artificial lawn so as not to degrade the natural beauty of the golf course.

Another object of the present invention is to provide a golf cart of the kind described above in which four golf bags can be carried in a crosswise arrangement in which a removable umbrella-like cover is provided for covering the golf bags, that portion of the cover covering each individual golf bag being individually removable so that access to individual golf bags may be easily obtained without affecting the protection provided by the cover to the other bags.

SUMMARY OF THE INVENTION

In accordance with the invention, there is provided a transportation apparatus in which an endless cable, e.g. rope, is driven by a motor within a series of U-shaped channel members buried in the ground just beneath the ground surface (with the top surface of the channel members at the ground surface). The cable is able to draw a cart or "caddy cart" and is generally supported only from the lateral sides thereof and, if necessary, the bottom side, even when the channel members are laid along a variety of landscapes. A pressing pulley contacting the top side of the cable is required only if and where the cable crosses over itself. Although it is necessary to disengage the cart from the cable at such a crossing point, other portions of the cable are not pressed at all from the top side by the pressing pulley, however steep the terrain may be. The cart, therefore, can run smoothly along the predetermined path of the cable and channel members without being disengaged from the cable.

In accordance with the invention, the channel members include pulleys mounted for rotation about axes perpendicular to the ground surface so as to contact the cable along the lateral side thereof so as to maintain the cable under tension. The cart includes a truck, a grip extending downwardly from the truck which is clampable to the cable so that the cart is pulled by the cable as the latter is moved along its path. The cart includes a main wheel for supporting the major portion of the cart directly over the channel members. A guide device is mounted to the truck and is extendable to the channel members for engaging the interior surface of the channel members to prevent the cart from falling over. In accordance with one aspect of the invention, the guide device includes a roller which engages the sidewalls of the channel members so as to keep the grip out of contact with the pulleys as the grip passes thereby.

In accordance with another aspect of the invention, the grip and guide device is pivotable about a horizontal axis so as to be selectively positionable inside and outside the channel members, the channel members having upper flanges, some of the channel members having openings in the flanges for selectively removing or inserting the grip and guide device.

In accordance with still another aspect of the invention, some of the channel members have wave-shaped internal channels with pulleys arranged alternately on opposite sides thereof so as to tightly engage the cable and prevent the same from pulling out of the channel members, particularly along steep slopes in valley-like areas.

In accordance with another aspect of the invention, the channel members are covered by narrow strips of flexible elastic artificial lawn upon which the main wheel of the cart rides. A separation member is provided forward of the grip and guide device for temporarily parting the strips as the cart proceeds along the path. Since the cart is supported primarily by the main wheel which travels along the artificial lawn strips, the natural lawn receives little wear as compared to conventional electric carts and other golf carts.

In accordance with another aspect of the invention, a small part of the load of the cart is borne by auxiliary wheels contactable with the natural lawn to stabilize the cart if the cart tilts to the left or right. Thus, almost all of the load is borne by the U-shaped channel members, the wear being taken mostly by the artificial lawn strips which are easily replaced.

Since the cart path of the present invention is so narrow and has so little impact upon the natural appearance of the golf course and the movement of golf balls which happen to contact it, the path may be provided, for example, along the center of the fairway, thus providing the golf bags at convenient locations on the golf course. This is possible since the U-shaped channels may have a width of about 10 cm, which is a small fraction of the width of conventional paved electric golf cart paths (about 150 cm) and is completely covered by artificial lawn which is almost indistinguishable in appearance from the natural lawn of the fairway. Also, the artificial lawn exhibits substantially equal ball bouncing characteristics to those of a natural lawn, in sharp contrast to the characteristics of paved vehicle paths.

In accordance with another aspect of the invention, the U-shaped channel members are in the form of blocks having straight, wavy and curved forms which can be mass-produced in a factory, and are connected and buried along the ground surface. It is possible to facilitate, and reduce the cost of, construction of 90° turns of the paths by using a plurality of curved blocks. The cable is made to run in an endless manner along the U-shaped channel members while being held and guided by the pulleys and rollers which are disposed in the channel members and respectively contactable with only the lateral sides and lower side of the cable. As mentioned above, the cart has a grip which is engagable and disengagable with and from the cable. The cart has a main wheel adapted to run on the channel members and auxiliary wheels adapted to run on the natural lawn. The cart is further provided with a guide device movable within the U-shaped channel members with a comparatively small resistance and disengagable from the channel members only at selected positions along the path of the U-shaped channel members. Thus, the cart can run automatically and smoothly without any mechanical damage or noise from the pulleys contacting the lateral sides of the cable due to contact with the grip.

In accordance with still another aspect of the invention, the golf cart holds four bags in crosswise relation. A centrally located umbrella-like cover for protecting the clubs and the golfers against the effects of the rain, sun and driven golf balls is provided with zippers or the like for removing portions of the umbrella from over the individual bags to permit each golfer to obtain or replace a club without affecting the protection provided for the remaining bags and golfers.

BRIEF DESCRIPTION OF THE DRAWINGS

These and other aspects of the invention will be better understood from the following detailed description of the preferred embodiment when taken with the appended drawings in which.

DETAILED DESCRIPTION OF A PREFERRED EMBODIMENT

In the preferred embodiment of the present invention, the invention is applied to a caddy cart to be used on a golf course.

Figure 1:
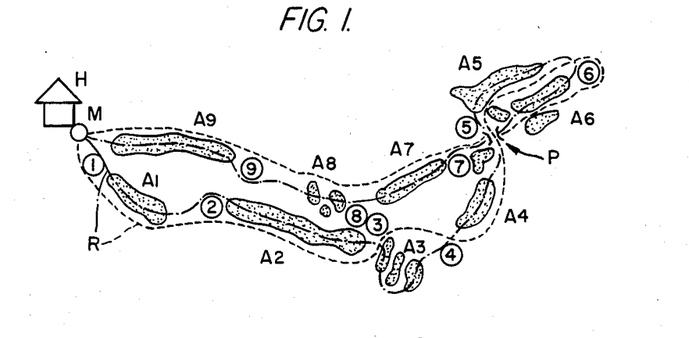
FIG. 1 is a schematic diagram of 9 holes of a golf course with the path of a cable in accordance with the present invention shown in dashed line.
Figure 2:
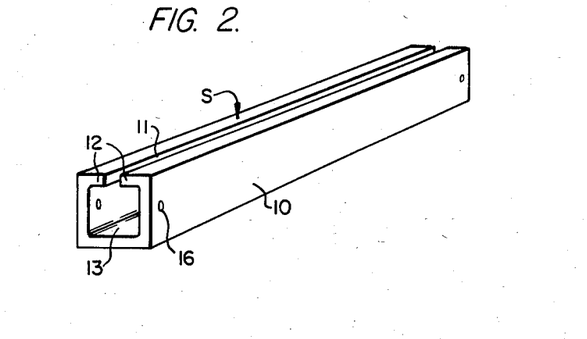
FIG. 2 is a perspective view of a straight U-shaped channel member in accordance with the present invention.

Referring first to FIG. 1, a golf course usually includes 9 out holes and 9 in holes. Starting from the clubhouse, the players (golfers) play 9 in holes or 9 out holes before returning to the clubhouse and then beginning the remaining 9 holes. Thus, the clubhouse is a base point for play.

Figure 6:
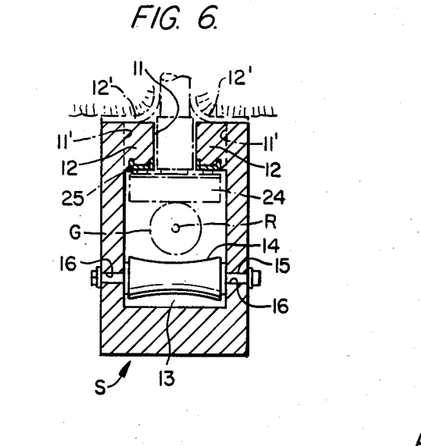
FIG. 6 is a sectional side elevational view of a straight U-shaped channel member.

Thus, the path of the caddy cart is extended from the clubhouse H and is defined by a plurality of end-to-end U-shaped channel members for guiding a cable therein along the path, which channel members include straight U-shaped channel members S, wavy U-shaped channel members W and curved U-shaped channel members C. These channel members are selected to conform with the landscape and are connected and laid substantially at the same level as the ground surface. Thus, the path extends from the tee 1 of the first hole and along the first fairway $A_1$ and rough thereof as shown by broken line or, alternatively, as shown by the dot-and-dash line, from the fairway $A_1$ and successively through the tee 2, fairway $A_2$, tee 3, fairway $A_3$, and so on through tee 9 and fairway $A_9$ and finally to the clubhouse H. The cable, e.g. rope, R is stretched through hole numbers 1–9 in an endless manner by a motor M of known design, while being supported by pulleys provided in the U-shaped channel members S, W, and C, as described below. The U-shaped channel members each have a mounting seat 10 for mounting the channel members on a foundation (in some situations straight U-shaped channel members S do not require the mounting seat). The channel members S, W, and C have top surfaces composed of flanges 12 of a comparatively small width, e.g. 10 cm, respectively defining therebetween open slits 11, 11a, and 11b of width no greater than 30–40 mm, and channel portions 13, 13a and 13b. As shown in FIG. 6, the straight U-shaped channel members S may be provided with shaft holes 16 for retaining shafts 15 of supporting rollers 14 which support the weight of the cable to prevent the slackening of the cable due to its weight.

Figure 3:
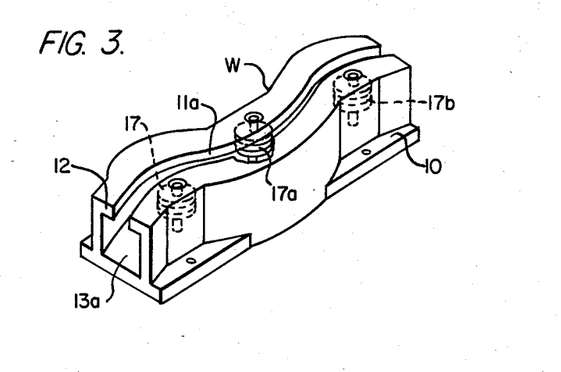
FIG. 3 is a perspective view of a wavy U-shaped channel member in accordance with the present invention.
Figure 4:
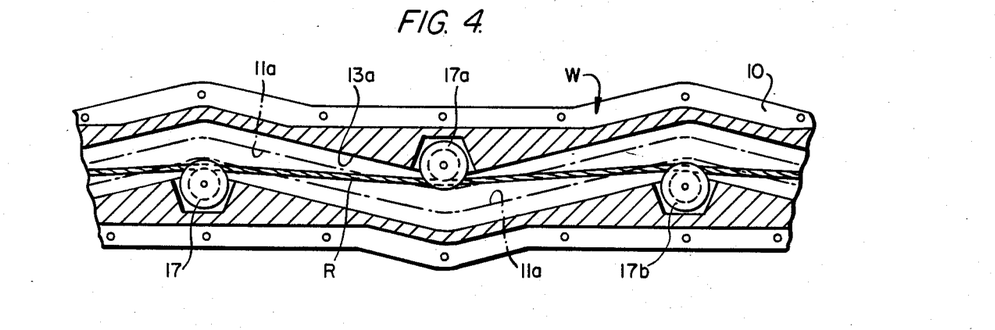
FIG. 4 is a sectional plan view of the wavy U-shaped channel member shown in FIG. 3.

As will be clearly seen from FIGS. 3 and 4, the wavy U-shaped channel members W have wave-shaped open slits 11a and wavy shaped channel portions 13a. As will be seen from FIG. 4, pulleys 17, 17a and 17b are arranged in a zig-zag form on both sides of the channel 13a so as to be rotatable about a vertical axis (perpendicular to the ground surface) with the flat end surfaces of the pulleys laid horizontally (in the plane of the ground). The cable R therefore runs in a wave-like form. Thus, each wavy U-shaped channel member W is formed as a block having a plurality of, e.g. 3, rope pulleys 17–17b.

Figure 5:
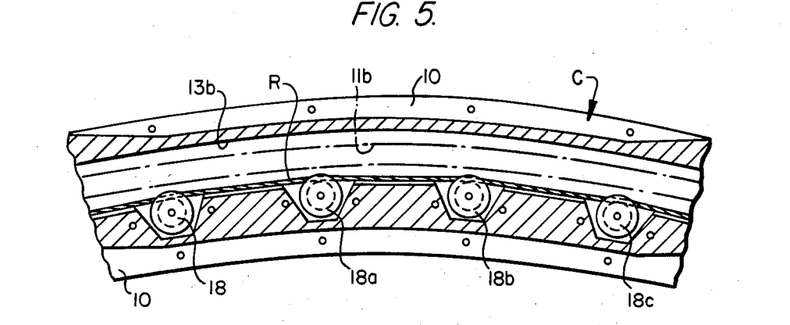
FIG. 5 is a sectional plan view of curved U-shaped channel member in accordance with the present invention.

Furthermore, each curved U-shaped channel member C has a curved open slit 11b and a curved channel portion 13b and a plurality of pulleys 18, 18a, 18b, and 18c fixed only at one side of the cable R, rotatable with their end surfaces laid horizontally to provide a cable path of a predetermined curvature. Pulleys 18–18c are generally provided on the inside of the curve of the curved channel portion 13b.

Figure 7:
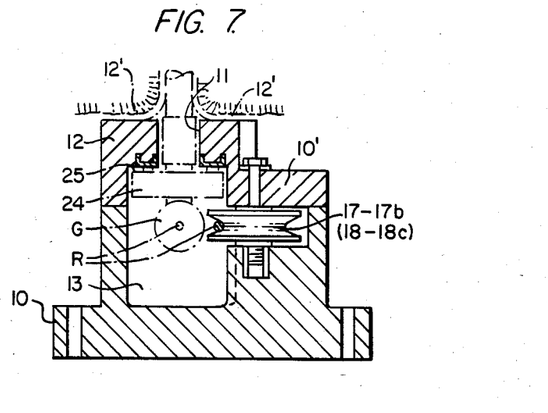
FIG. 7 is a sectional side elevational view of a U-shaped channel member taken along a plane containing the axis of a pulley in accordance with the present invention.

In some of the U-shaped channel members, particular in the straight U-shaped channel members S, the flanges are partly cut and removed at suitable selected portions to provide openings 11' for insertion and removable of the grips G and guide devices T and T' as described in greater detail below. As stated above, the wavy U-shaped channel members W and the curved U-shaped channel members C are respectively provided with pulleys 17–17b and 18–18c. The width of the channel is increased at the portions where these pulleys are provided, so that the widths of the wavy and curved U-shaped channel members do not coincide with the width of the straight U-shaped channel members S. The portions of the enlarged width are, however, formed with depressed upper surfaces 10' as shown in FIG. 7 and are buried under the ground. By so doing, it is possible to obtain a good appearance since all of the U-shaped channel members appear to have a uniform width over the entire length of the path, as is apparent from a comparison of FIGS. 6 and 7. The upper surfaces of the flanges are covered with artificial lawn 12' made of colored flexible material, or alternatively, with colored rubber plates so as to close the open slits 11, 11a and 11b.

Figure 8:
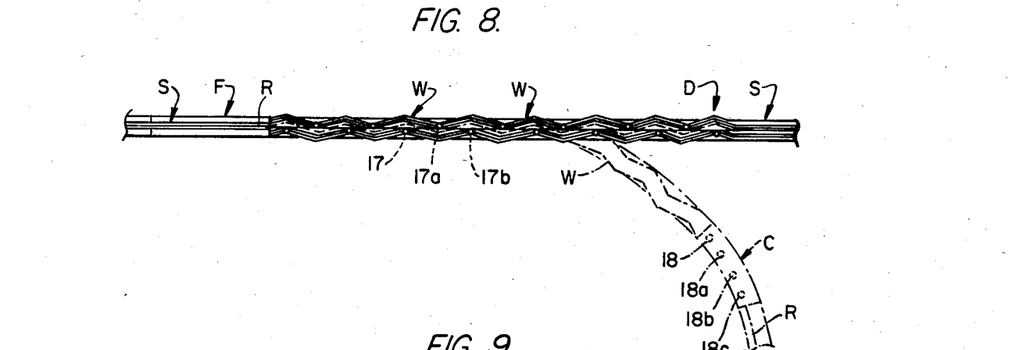
FIG. 8 is a plan view of a line of U-shaped channel members laid along a valley or a curve.
Figure 9:
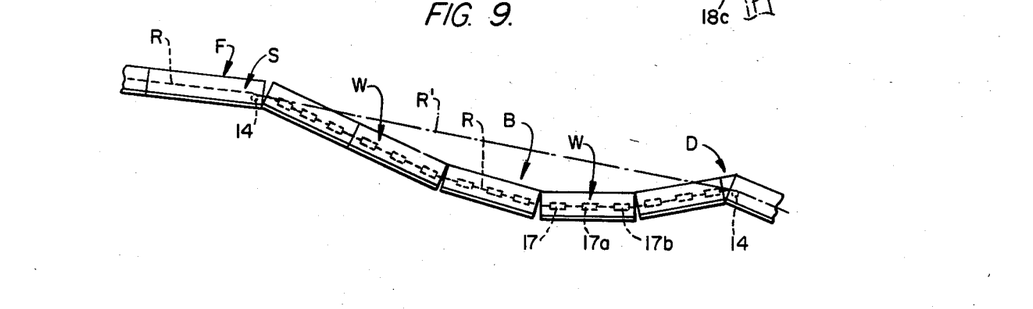
FIG. 9 is a front elevational view showing the U-shaped channel members in a line laid along a valley or along a curve.

The manner in which these U-shaped channel members S, W, and C are used, is now explained with reference to FIGS. 8 and 9. Where the cable R runs along a straight line in a flat ground area F, the straight U-shaped channel members S are connected in series linearly, and supporting rollers 14 are attached to suitable portions of the straight U-shaped channel members S with their retaining shafts 15 mounted in shaft holes 16.

Rollers 14 are intended to prevent any friction between the cable R and the inner wall of the channel portion 13. When the cable path curves to the left and right on the flat area F, the curved U-shaped channel members C are connected to form the desired curve. The support of the cable on the crest area D in the curved section can easily be attained by the pulleys 18–18c contacting only the lower side and one lateral side of the cable. When the cable R passes through a low area B as shown in FIG. 9, however, the cable R naturally tends to jump up by the tension as indicated by the dot-and-dash line R'.

According to the invention, the cable R is held down by the wavy U-shaped channel members W. The cable R is laid substantially in parallel with the ground surface in a zig-zag form along the pulleys 17–17b arranged in such zig-zag form. Thus, in this case, the path of the cable curved along the profile of a valley is constituted by a plurality of comparatively short linear sections. The curvature along the profile of the valley includes a number of short linear sections between adjacent pulleys so that any floating or jumping of the cable R is prevented because the force which tends to cause the jumping is resisted by several pulleys. Since there is no obstacle, such as a pressing pulley on the top surface of the cable R, the grip which is suspended from the cart, as will be explained in detail below, can pass along the valley B without necessitating disengagement from the cable. Along a steep slope in a valley area, the connection between the wavy U-shaped channel members W is made to form a slight angle therebetween, or alternatively, the path is formed to ascend or descend the slope obliquely by a suitable combination of wavy U-shaped channel members W and curved U-shaped channel members C so that the gradient of the path is that of a less steep slope. This arrangement makes it possible to lay the path in a winding form in along the slope of the valley area.

Following is an explanation of a caddy cart in accordance with the present invention, having a grip engagable with and disengagable from the cable R which is extended in the channel portions 13, 13a and 13b of the U-shaped channel members S, W and C along the supporting rollers 14 and pulleys 17–17b and 18–18c.

Figure 10:
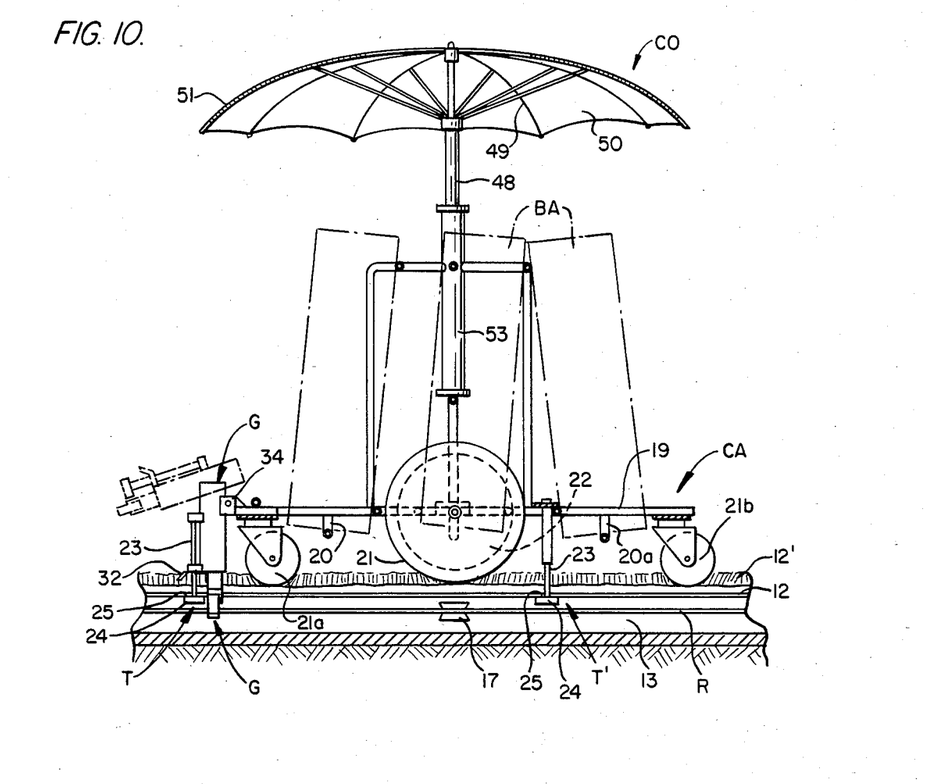
FIG. 10 is a partial sectional view of a caddy cart in accordance with the present invention.
Figure 11:
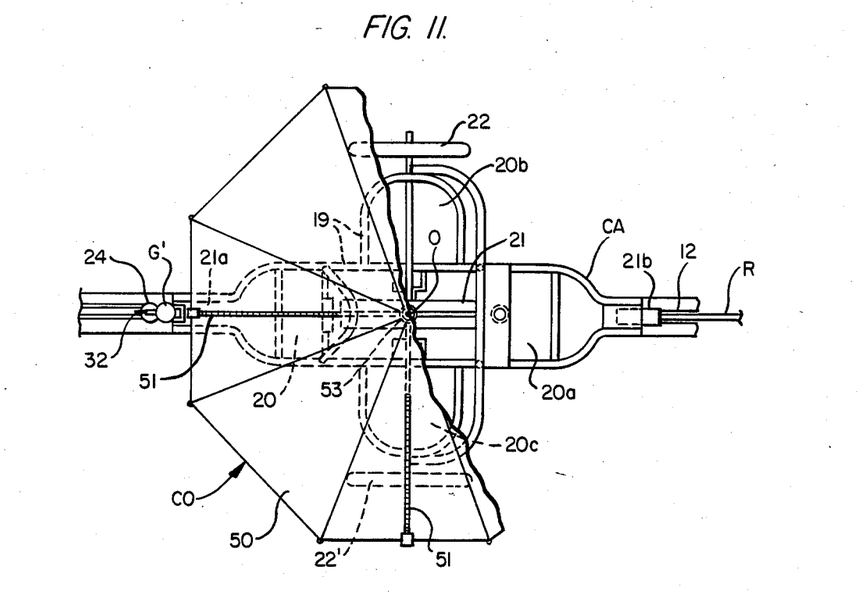
FIG. 11 is a plan view of the caddy cart shown in FIG. 10.

Referring to FIGS. 10 and 11, the caddy cart of the invention CA has a weight which is almost equal to that of a conventional four bag hand cart (about 25 Kg) and a main wheel 21 adapted to roll on the U-shaped channel members S, W, and C is provided at a position substantially directly under the center of gravity of the cart so as to bear 70 to 80% of the total weight. In order to prevent the cart from turning sideways, several auxiliary wheels 21a, 21b, 22, and 22' are provided to bear the rest of the weight, i.e. 20–30% of the total weight of the cart and its contents, and when the balance of the weight of the cart on the main wheel 21 is lost. The cart CA has a truck 21 having a frame-like structure having a cross-shaped horizontal cross section, and four box-shaped frame portions (boxes) 20, 20a, 20b, and 20c arranged in crosswise relation for carrying and fixing golf bags BA such that the center O of the total weight is located substantially at the center of the truck 19.

Auxiliary wheels 22 and 22' are fixed on both lateral sides of the main wheel 21. In order to prevent contact of the auxiliary 22 and 22' with the ground surface in the balanced state of the cart CA on the main wheel 21, the auxiliary wheels 22 and 22' each have a diameter smaller than that of the main wheel 21 and are arranged coaxially therewith, or alternatively, the axis of the auxiliary wheels can be positioned above that of the main wheel 21. Auxiliary wheels 21a and 21b are provided at the front and rear sides of the main wheel 21 in alignment therewith and are adapted to contact the surface of the U-shaped channel members S, W, and C as is the main wheel 21. The cart CA is provided at the front and rear side of the wheel with guide devices T and T', respectively, and at least one grip G. The guide devices T and T' and the grip G are attached to the truck 19. Guide device T' may be eliminated if adequate balancing of the cart CA is obtained without it.

Figure 12:
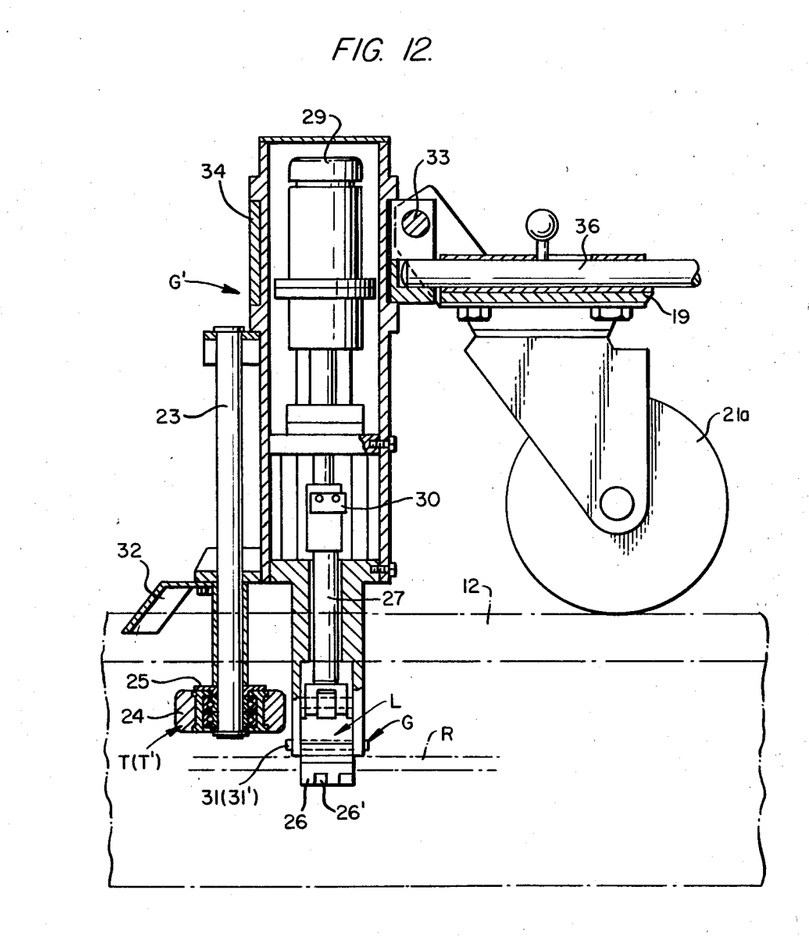
FIG. 12 is a sectional side elevational view of a guide device and a grip device in accordance with the present invention.

Referring to FIGS. 10 and 12, the guide devices T and T' include rotary members 24 mounted rotatable on vertical shafts 23 through ball bearings respectively forward of grip G and rearward of main wheel 21. Rotary members 24 are guided by the vertical walls in the channel portion of each U-shaped channel member S, W, and C. The cart CA is further provided with contact portions 25 above rotary members 24, which are contactable with the inner surface of the flanges 12 when the cart CA is tilted backward or forward due to an unbalance of weight. The guide device T is attached to a grip device G' having a grip G. The grip device G' is supported somewhat rotatably and has a ring-shaped holder 34. The holder 34 is adapted to be moved pivotably around a horizontal pivot shaft 33, by manual operation or an automatic remote control device of known construction, so as to move out of and into the U-shaped channel member at the openings 11'. Reference number 32 designates an angle-shaped lead member which is adapted to wedge and separate the flexible artificial lawn strips 12'. The other guide device T' has a rotary member 24 and a contact portion 25 identical to those of the device T. Instead of the pivotal movement around the horizontal pivot shaft 33, guide device T' may be constructed to move vertically into and out of the U-shaped channel member as illustrated in FIG. 10. A lock pin 36 projects from truck 19 into the holder 34 to secure the grip device G'.

Figure 13:
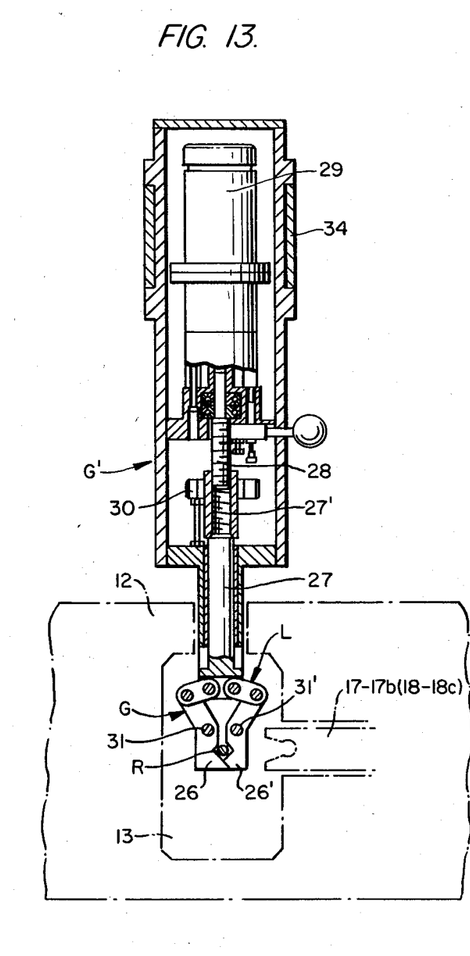
FIG. 13 is a sectional front elevational view of a grip device in accordance with the present invention.

As shown in FIGS. 12 and 13, in accordance with the preferred embodiment of the invention, the grip G has cable clamps 26 and 26', respectively pivotable about pins 31 and 31' and adapted to clamp and unclamp the cable R through a tongue-type link device L by the vertical movement of a vertically movable shaft 27. The vertically movable shaft 27 is connected to a nonrotatable nut tube 27' which is in turn screwed into a screw rod 28. As the screw rod 28 is rotated by a motor 29, the vertically movable shaft 27 is moved linearly upward and downward together with the screw tube 27', limited by a switch 30, to permit the clamps 26 and 26' to clamp and unclamp the cable R.

An umbrella-like cover CO for covering the entire cart CA is illustrated in FIGS. 10 and 11 and is supported by a support 53 extending vertically from the center of the cart CA. The cover CO is detachable and vertically adjustable and comprises a handle 48, ribs 49 and a sheet 50 attached to the ribs 49, the cover being similar in construction to a foldaway umbrella. The sheet 50, however, is provided with circumferentially spaced, radially extending "switch gears" (zippers or the like). Accordingly, part of the sheet 50 can be opened as necessary without affecting the remaining portion of the cover CO.

The operation of the invention is explained as follows. In operation, in the area of the golf course near the clubhouse H, such as within a cart storage area or building, the caddy cart CA is positioned over the opening 11' in a straight U-shaped channel member S as explained above with reference to FIG. 6. Then, manually or by means of an electric motor, the guide devices T and T' and the grip device G are rotated about the pivot shaft 33 or linearly lowered as the case may be into the straight U-shaped channel member S until the clamps 26 and 26' are positioned at both sides of the cable R. Golf bags BA are mounted at this time or beforehand in respective boxes 20-20c and fastened by means of belts or the like. In this state, the main wheel 21 straddles the opening 11' and is held in contact with the upper surface of the straight U-shaped channel member S. As the motor 29 is started, the screw rod 28 is rotated so that the vertically movable shaft 27 is lowered until the motor is stopped by the operation of limit switch 30. At the same time, the clamps 26 and 26' are rotated about pins 31 and 31' to firmly clamp and grip the cable R so that the cart CA moves at the same speed as the speed of the cable R, which speed is suitably somewhat higher than the normal walking speed of an average person.

On the golf course, the invasion of the channel portions 13–13b by rainwater, stones and sand is prevented by the artificial lawn strips 12' attached to the top surface of the U-shaped channel members S, W and C which close the open slit 11. When the caddy cart is running, the artificial lawn pieces 12' are split and separated by separation member 32. On a golf course, the landscape is generally complicated so that the cart often leans to the left or right, but the cart of the present invention is prevented from turning on its side by the auxiliary wheels 22 and 22' which contact the ground surface to provide sideways stability. In addition, neither of the guide devices T or T' come out of the U-shaped channel members S, W and C because the contact portions 25 make contact with the inner surface of one or both of the flanges 12. In consequence, the cart CA can safely run without tipping substantially sideward, forward or backward. The rotary members 24 guide the grip G by making contact with the inner walls of the channel portions 13, 13a, and 13b of the respective U-shaped channel members S, W, and C and hold the same substantially at a predetermined position so that any noise, which may be otherwise caused through contact between the grip G and the pulleys 17–17b and 18–18c or the supporting roller 14, is completely eliminated.

The cart CA runs along the fairways $A_1$–$A_9$ accompanying the golfer in the manner explained above. Each time the golfer is preparing to hit the ball, the cart can be stopped temporarily. To this end, the motor 29 is operated to open the clamps 26 and 26' to release the cable so that the cart stops. As stated above, openings 11' are formed at predetermined locations where the player can rotate the guide device T and the grip device G' around the pivot shaft 33 after removing the lock pin 36 and move guide device T' vertically upward to move the same out of the U-shaped channel member. In this state, the cart can be manually moved to any desired place.

At such crossing points P as the cable crosses over itself or another cable (see FIG. 1), openings 11' are formed in the U-shaped channel member in the portion of the path which passes under the other, just in front and behind the crossing points P. In use, the guide devices T and T' and grip device G' are taken out of the front U-shaped channel member in front of crossing point P before the cart reaches the crossing point P. Then, after manually moving the cart across the crossing point, the guide devices T and T' and the grip device G' are inserted in the U-shaped channel member behind the crossing point P.

The U-shaped channel members S, W, and C are adapted to be buried at the same level as the earth surface so that the artificial lawn is level with the natural lawn and invasion by soil, sand, and grasses can be minimized. When, however, such materials do penetrate the U-shaped channel members, the running of the guide device and the grip may be hindered. In order to obviate such a problem, it is possible to clean the interior of the U-shaped channel member simply by connecting a vacuum cleaner to the cable with the suction part of the vacuum cleaner projecting into the U-shaped channel members so that the cleaner is drawn along the course by the cable, cleaning the U-shaped channel members as it moves.

The running of the carts CA which would otherwise often be unstable because of the presence of slopes in the golf course, is made smooth by the contact portion 25 which prevents the guide devices T and T' from coming out of the channel portions 13, 13a, and 13b and by the rotary members 24 which can lightly contact the vertical walls of the channel portions when the cart tilts to the left or right. Forward and rearward inclination of the cart is prevented by the presence of the front wheel 21a and the rear wheel 21b. The major part of the load of the cart and its contents is carried by the main and auxiliary wheels 21, 21a, and 21b. These wheels, however, run on the artificial lawn 12' on the U-shaped channel members, which can be easily replaced when worn or damaged and, hence the natural lawn is not damaged. In addition, the auxiliary wheels 22 and 22' for preventing the cart from turning on its side to the left and right make contact with the natural lawn only slightly when the cart is tilted, so that the damage to the natural lawn is much smaller than would result if the wheels 22 and 22' were continuously in contact with the natural lawn. Also, the wheels 22 and 22' are quite effective in stably supporting the cart when the latter is moved manually.

According to the invention, it is possible to lay the path of the cart along the central portion of the fairway, which speeds play and reduces the need for a caddy. Since the path of the U-shaped channel members is covered by narrow strips of artificial lawn or rubber plates having a natural appearance, the invention does not detract from the natural beauty of the golf course as does a convention paved golf-cart path.

During play, the cover CO provides golfers and golf clubs with protection from the rain, sun, and errantly driven golf balls. When one or more golfers desire to remove or replace a golf club in his bag, he may improve access to the bag by temporarily removing a portion of the cover CO over his clubs by unzipping the appropriate zipper 51, thus not affecting the protection to other players and golf clubs provided by the other portions of the cover CO.

The above-described preferred embodiment of the present invention is merely illustrative of the present invention. Numerous modifications and adaptions thereof will be readily apparent to those skilled in the art without departing from the spirit and scope of the present invention which is defined by the appended claims.

What is claimed is:

1. An automatic transportation system using a closed cable comprising:
   a plurality of U-shaped channel members embedded end-to-end along a ground surface to define a closed elongated longitudinally extending path therealong so that the closed cable is extendable along said path within said plurality of channel members so as to be longitudinally movable therein along said path, said channel members including pulleys mounted therein for rotation about axes perpendicular to the ground surface so as to contact the cable along the lateral sides thereof so as to maintain the cable under tension; and
   a cart, said cart including a truck, a grip extending downward from said truck clampable to the cable so that said cart is pulled by the cable when the cable is moved along said path, a main wheel rotatably mounted to said truck centrally thereof for rotatably supporting said cart on said channel members, a guide device mounted to said truck and extendable into said channel members for engaging the interior surface of said channel members to prevent said cart from falling over, means for carrying four golf bags in crosswise relation, and an umbrella-shaped cover removably mounted to said truck so as to cover the golf bags, said cover including a cover sheet and means in said cover sheet, including four radially extending zippers formed in said cover sheet, for uncovering any number of the golf bags while the remaining golf bags are covered, whereby opening any one of said four zippers provides access to one of the golf bags while the cover continues to cover the remaining golf bags.

2. A system as in claim 1, wherein said grip and said guide device are pivotally mounted to said truck, whereby said grip and said guide device are selectively positionable inside said channel members and outside said channel members so that said cart can be moved off said channel members.

3. A system as in claim 2, wherein said channel members each include confronting spaced upper flanges, said guide device being engagable with said upper flanges from inside said channel members, at least one of said channel members having an opening in said flanges for receiving therethrough said guide device.

4. A system as in claim 3, further comprising elastic flexible longitudinally extending strips covering said flanges; said cart further comprising means, fixed to said truck, for extending between said strip forward of said guide device and said grip so as to temporarily part said strips as said cart moves along said path.

5. A system as in claim 1, wherein said channel members include vertical sidewalls and upper flanges, said guide device including a rotatable guide member for contacting said sidewalls and a contact portion for contacting the inner surface of said flanges, so as to guide said cart along said path to prevent said grip from contacting said pulleys.

6. A system as in claim 1, wherein said path includes valley portions having steep grades, said pulleys comprising means for retaining the cable completely within said channel members along said valleys.

7. A system as in claim 1, wherein said plurality of channel members includes at least one first channel member defining a wave-shaped channel therein, said pulleys being located on alternate sides of said wave-shaped channel.

8. A system as in claim 7, wherein said plurality of channel members includes at least one second channel member defining a curved channel for being embedded along a curve in said path, said pulleys being located on the inside of said curve in said curved channel.

9. A golf cart for carrying golf bags around a golf course drawn by an endless cable extending in a U-shaped channel embedded in the ground, said cart comprising a truck for carrying a plurality of golf bags in generally crosswise relation, a main wheel rotatably mounted to said truck for supporting said cart on said channel, and an umbrella-shaped cover including a cover sheet removably mounted to said truck so as to cover the golf bags, said cover including means for uncovering any number of the plurality of golf bags while the remaining golf bags remain covered by said cover sheet.

10. A golf cart as in claim 9, wherein said uncovering means includes a plurality of angularly spaced radially extending zippers one for each golf bag formed in said cover sheet, whereby opening of any one of said zippers provides access to one of the golf bags while said cover sheet continues to cover the remaining golf bags.

11. A golf cart as in claim 10, wherein said uncovering means includes four radially extending zippers formed in said cover sheet.

12. A golf cart for carrying golf bags around a golf course, said cart comprising a truck for carrying a plurality of golf bags in generally crosswise relation, and an umbrella-shaped cover including a cover sheet removably mounted to said truck so as to cover the golf bags, said cover including means for uncovering any number of the plurality of golf bags while the remaining golf bags remain covered.

13. A golf cart as in claim 12, wherein said uncovering means includes a plurality of angularly spaced radially extending zippers one for each golf bag formed in said cover sheet, whereby opening of any of said zippers provides access to one of the golf bags while said cover sheet continues to cover the remaining golf bags.

14. A golf cart as in claim 13, wherein said truck comprises means for carrying four golf bags in generally crosswise relation and said plurality of zippers includes four radially extending equiangularly spaced zippers formed in said cover sheet.

* * * * *